US008970136B2

(12) United States Patent
Kikuchi et al.

(10) Patent No.: US 8,970,136 B2
(45) Date of Patent: Mar. 3, 2015

(54) SEMICONDUCTOR LIGHT SOURCE LIGHTING CIRCUIT AND VEHICULAR LAMP

(71) Applicants: Satoshi Kikuchi, Shizuoka (JP); Takanori Namba, Shizuoka (JP); Masayasu Ito, Shizuoka (JP); Daijiro Arisawa, Kyoto (JP); Mikio Motomori, Osaka (JP)

(72) Inventors: Satoshi Kikuchi, Shizuoka (JP); Takanori Namba, Shizuoka (JP); Masayasu Ito, Shizuoka (JP); Daijiro Arisawa, Kyoto (JP); Mikio Motomori, Osaka (JP)

(73) Assignee: Panasonic Corporation, Tokyo (JP)

( * ) Notice: Subject to any disclaimer, the term of this patent is extended or adjusted under 35 U.S.C. 154(b) by 0 days.

(21) Appl. No.: 14/197,571

(22) Filed: Mar. 5, 2014

(65) Prior Publication Data

US 2014/0252950 A1    Sep. 11, 2014

(30) Foreign Application Priority Data

Mar. 7, 2013   (JP) .................................. 2013-045731

(51) Int. Cl.
*H05B 37/02*   (2006.01)
*H05B 33/08*   (2006.01)
*B60Q 1/00*    (2006.01)

(52) U.S. Cl.
CPC .............. *H05B 33/0815* (2013.01); *B60Q 1/00* (2013.01)

USPC ............................. 315/308; 315/291; 315/82

(58) Field of Classification Search
USPC .................. 315/77, 82, 209 R, 247, 291, 308
See application file for complete search history.

(56) References Cited

U.S. PATENT DOCUMENTS

| 7,425,803    | B2 * | 9/2008  | Shao et al.   | 315/308 |
| 7,944,153    | B2 * | 5/2011  | Greenfeld     | 315/291 |
| 2012/0212143 | A1 * | 8/2012  | Esaki et al.  | 315/192 |

FOREIGN PATENT DOCUMENTS

JP           2005-198410 A      7/2005

* cited by examiner

*Primary Examiner* — Thuy Vinh Tran
(74) *Attorney, Agent, or Firm* — Sughrue Mion, PLLC (57) ABSTRACT

A semiconductor light source lighting circuit includes a voltage step-down unit configured to generate a drive voltage lower than an input voltage by turning on or off a first switching element in a voltage step-down mode, a voltage step-up unit configured to generate the drive voltage higher than the input voltage by turning on or off a second switching element in a voltage step-up mode, and a controller. The controller includes a charge pump unit configured to repeat charging from the drive voltage to a second capacitor and discharging from the charged second capacitor to the first capacitor in the voltage step-up mode, and a switch drive unit configured to apply a voltage higher than the voltage at the other end of the first switching element to the control terminal of the first switching element by using a voltage of the charged first capacitor.

8 Claims, 6 Drawing Sheets

VOLTAGE STEP-DOWN MODE WITHOUT DIMMING

FIG. 2B

VOLTAGE STEP-DOWN MODE WITH DIMMING

FIG. 2C

VOLTAGE STEP-UP MODE WITHOUT DIMMING

FIG. 2D

VOLTAGE STEP-UP MODE WITH DIMMING

SEMICONDUCTOR LIGHT SOURCE LIGHTING CIRCUIT AND VEHICULAR LAMP

CROSS-REFERENCE TO RELATED APPLICATION(S)

The present application claims the benefit of priority of Japanese Patent Application No. 2013-045731 filed on Mar. 7, 2013. The disclosures of the application are incorporated herein by reference.

BACKGROUND

1. Technical Field

The present disclosure relates to a semiconductor light source lighting circuit which applies a drive voltage to a semiconductor light source, such as a Light Emitting Diode (LED) and the like, and a vehicular lamp which includes the semiconductor light source lighting circuit.

2. Related Art

In recent years, an LED which has a longer lifetime and lower power consumption, instead of a halogen lamp which has a filament of the related art, is used in a vehicular lamp such as a headlight and the like. The intensity of LED emission, that is, brightness, is dependent on the magnitude of a current flowing in the LED, such that a lighting circuit for adjusting the current flowing in the LED is needed when using the LED as a light source. Such a lighting circuit usually has an error amplifier to perform feedback control so that the current flowing in the LED is constant.

Electricity to a lighting circuit is supplied from a normal vehicle battery. Since the vehicle battery supplies electricity to various portions of a vehicle in addition to the lighting circuit, such that a change in a battery voltage is relatively large. When the battery voltage changes across the forward dropping voltage of the LED, it is preferable that the lighting circuit have both a function of stepping up a battery voltage and a function of stepping down the battery voltage.

JP-A-2005-198410 discloses a DC/DC converter of a step-up and step-down chopper type. In the converter, a p-type metal oxide semiconductor field effect transistor (hereinafter, referred to as p-type MOSFET) is adopted as a high-side switching element.

In an LED which is used as a light source of a vehicular lamp, generally a relatively large current flows so as to realize a required brightness. Therefore, when using the DC/DC converter of the step-up and step-down chopper type to light the LED, it is preferable to use, in general, an n-type metal oxide semiconductor field effect transistor (hereinafter, referred to as n-type MOSFET) which has a lower on-resistance than the p-type MOSFET as a high-side switching element.

In order to turn on the n-type MOSFET, a gate voltage needs to be higher than a source voltage. In response to this, a bootstrap circuit which generates a necessary gate voltage by using ON and OFF operation of the n-type MOSFET itself is known. In addition, in a voltage step-up mode of the voltage step-up and step-down converter, a high-side n-type MOSFET has to be on all the time, such that a charge pump for charging a bootstrap capacitor in the voltage step-up mode is considered to be additionally provided.

However, in the above configuration, when the input voltage to the voltage step-up and step-down converter is lowered, even if the voltage step-up and step-down converter needs to operate in the voltage step-up mode, the charge capacity of the charge pump is lowered along with the lowering of the input voltage.

SUMMARY

Exemplary embodiments of the invention provide a semiconductor light source lighting circuit and a vehicular lamp which includes the semiconductor light source lighting circuit, which can appropriately respond to the lowering of an input voltage in a case where a switching element, which is turned on when a voltage applied to a control terminal is higher than a voltage of an input/output terminal, is adopted as a voltage step-down switching element of the voltage step-up and step-down converter.

A semiconductor light source lighting circuit which receives an input voltage and applies a drive voltage to a semiconductor light source, according to an exemplary embodiment, comprises:

a voltage step-down unit configured to generate the drive voltage lower than the input voltage by turning on or off a first switching element in a voltage step-down mode, the first switching element having one end to which the input voltage is applied;

a voltage step-up unit configured to generate the drive voltage higher than the input voltage by turning on or off a second switching element in a voltage step-up mode, the second switching element having one end to which a fixed voltage lower than the input voltage is applied; and a controller configured to control on or off of the first switching element and the second switching element, wherein the first switching element is turned on when a voltage applied to a control terminal of the first switching element is higher than a voltage at the other end of the first switching element, and wherein the controller includes:

a bootstrap unit configured to charge a first capacitor based on a change in voltage at the other end of the first switching element in the voltage step-down mode;

a charge pump unit configured to repeat charging from a terminal to which the drive voltage is applied to a second capacitor and discharging from the second capacitor which is charged to the first capacitor in the voltage step-up mode; and a switch drive unit configured to apply a voltage higher than the voltage at the other end of the first switching element to the control terminal of the first switching element by using a voltage of the first capacitor which is charged when the first switching element is turned on.

A semiconductor light source lighting circuit which receives an input voltage and applies a drive voltage to a semiconductor light source, according to another exemplary embodiment, comprises:

a voltage step-down unit configured to generate the drive voltage lower than the input voltage by turning on or off a first switching element in a voltage step-down mode, the first switching element having one end to which the input voltage is applied;

a voltage step-up unit configured to generate the drive voltage higher than the input voltage by turning on or off a second switching element in a voltage step-up mode, the second switching element having one end to which a fixed voltage lower than the input voltage is applied; and a controller configured to control on or off of the first switching element and the second switching element, wherein the first switching element is turned on when a voltage applied to a control terminal of the first switching element is higher than the voltage at the other end of the first switching element, wherein the controller includes:

a control voltage generation unit configured to generate a control voltage for operating the controller from the input voltage;

a bootstrap unit configured to charge a first capacitor based on a change in voltage at the other end of the first switching element in the voltage step-down mode;

a charge pump unit configured to repeat charging to a second capacitor and discharging from the second capacitor which is charged to the first capacitor in the voltage step-up mode;

a switch drive unit configured to apply a voltage higher than the voltage at the other end of the first switching element to the control terminal of the first switching element by using a voltage of the first capacitor which is charged when the first switching element is turned on; and a compensation unit configured to start a control to turn on or off the first switching element at a first frequency when the control voltage is lower than a threshold voltage in the voltage step-up mode, and wherein a second frequency at which the second switching element is turned on or off is higher than the first frequency in the voltage step-up mode.

A vehicular lamp according to the other exemplary embodiment comprises:

the semiconductor light source lighting circuit; and a semiconductor light source to which the drive voltage is applied by the semiconductor light source lighting circuit.

Any combination of the above components and a replacement of components and expressions of the invention between devices, methods, and systems are effective as an embodiment of the invention.

According to the invention, in a case where a switching element, which is turned on when a voltage applied to a control terminal is higher than a voltage of an input/output terminal, is adopted as a voltage step-down switching element of the voltage step-up and step-down converter, it is possible to provide a semiconductor light source lighting circuit which can appropriately respond to the lowering of the input voltage.

DETAILED DESCRIPTION

Hereinafter, the same or similar components, members, and signals shown in each drawing are referred to with like numerals in all the drawings, and thereby an overlapping description is appropriately omitted. Additionally, a portion of a member which is not important in explanation of each drawing is omitted. Moreover, numerals attached to voltages, currents, or resistances are used to represent voltage values, current values, or resistance values, if necessary.

In the specification, "a state in which a member A is connected to a member B" includes, in addition to a case in which the member A and the member B are physically connected in a direct manner, a case in which the member A and the member B are connected in an indirect manner through another member which does not affect an electrical connection state. Similarly, "a state in which a member C is provided between the member A and the member B" includes, in addition to a case in which the member A and the member C, or the member B and the member C are directly connected, a case in which the member A and the member C, or the member B and the member C are indirectly connected through another member which does not affect the electrical connection state.

First Embodiment

In an LED lighting circuit according to a first embodiment, as a high-side switching element of a voltage step-up and step-down converter, a switching element which is turned on when a voltage applied to a control terminal is higher than a voltage of an input/output terminal, is adopted. For example, as a high-side switching element, an n-type MOSFET or an npn-type bipolar transistor is adopted. In particular, the n-type MOSFET is more suitable for an application with a large flowing current than a p-type MOSFET.

The voltage step-up and step-down converter includes a bootstrap unit for turning a high-side n-type MOSFET on. The bootstrap unit charges a bootstrap capacitor based on a change in source voltages of the n-type MOSFET when the n-type MOSFET is turned on and off. The voltage of the bootstrap capacitor charged in this manner is used to apply a voltage higher than the source to a gate of the n-type MOSFET.

The voltage step-up and step-down converter includes a charge pump unit for maintaining an ON state of the high-side n-type MOSFET in a voltage step-up mode. The charge pump unit uses an output voltage of the voltage step-up and step-down converter to charge the bootstrap capacitor in a voltage step-up mode. In a voltage step-up mode, an output voltage of the voltage step-up and step-down converter is higher than an input voltage of the voltage step-up and step-down converter and a control voltage of a control integrated circuit (IC). Therefore, according to an LED lighting circuit in the embodiment, compared to a case in which the charge pump unit uses the input voltage and the control voltage to charge the bootstrap capacitor, it is possible to more stably maintain the ON state of the high-side n-type MOSFET in the voltage step-up mode.

Figure 1:
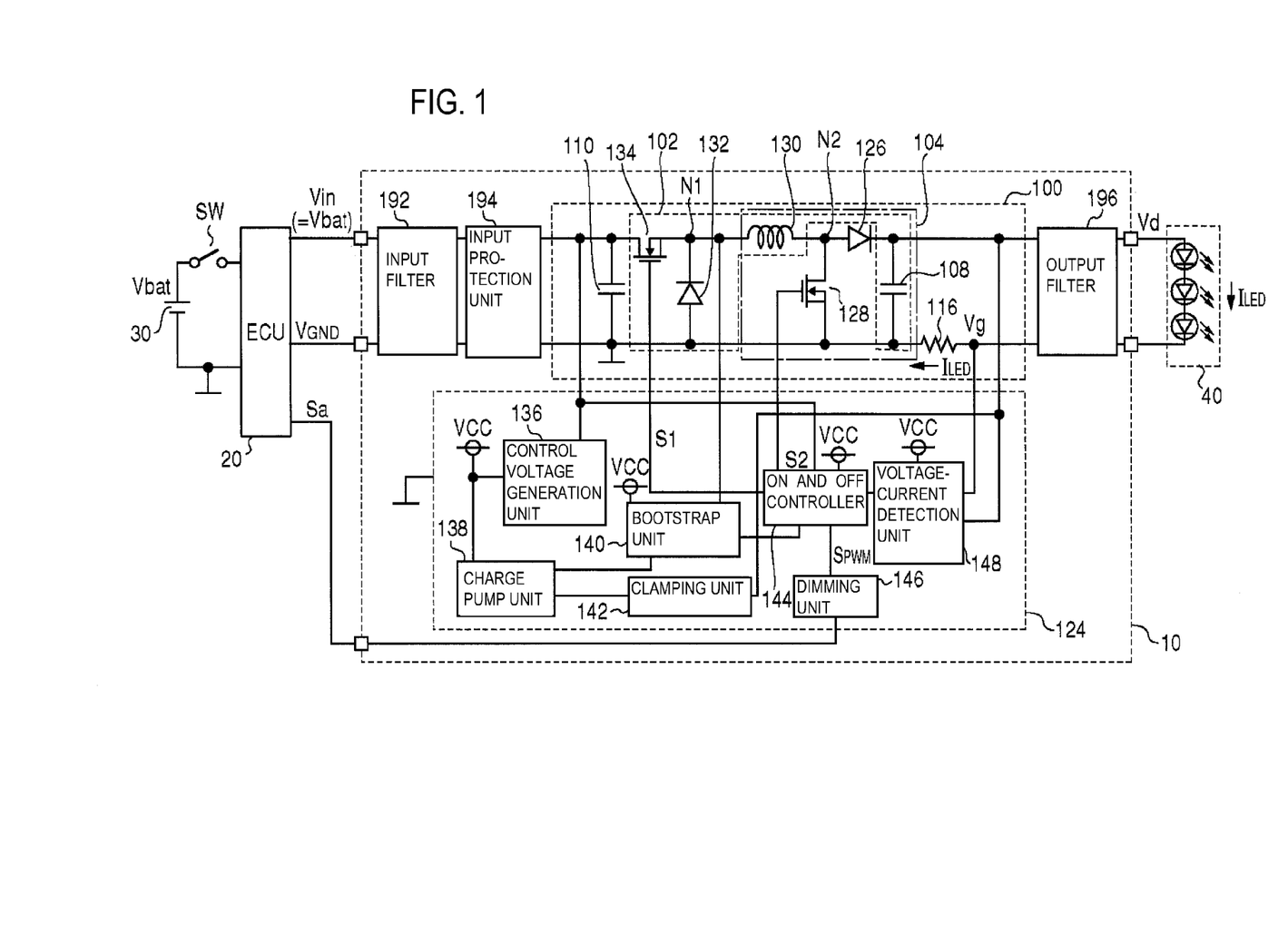
FIG. 1 is a circuit diagram which shows a configuration of an LED lighting circuit according to a first embodiment.

FIG. 1 is a circuit diagram which shows a configuration of an LED lighting circuit 10 according to the first embodiment. The LED lighting circuit 10 is connected to an electronic control unit 20 and an LED 40 which is configured by connecting three vehicle LEDs in series. The LED lighting circuit 10 and the LED 40 are mounted on a vehicular lamp such as a headlight.

The electronic control unit 20 is a microcomputer for performing overall electrical control on a vehicle such as an automobile. The electronic control unit 20 is connected to a vehicle battery 30 through a switch SW, and receives a battery voltage Vbat from the vehicle battery 30 by turning on the switch SW. The electronic control unit 20 supplies a direct current battery voltage Vbat as the input voltage Vin to the LED lighting circuit 10. The electronic control unit 20 supplies a fixed voltage lower than the input voltage Vin, that is, a ground potential $V_{GND}(=0V)$, to the LED lighting circuit 10. The electronic control unit 20, when the degree of emission of the LED 40, that is, brightness, needs to be adjusted, generates a dimming instruction signal Sa to supply the signal to the LED lighting circuit 10. The dimming instruction signal Sa is a signal indicating a set value of a dimming rate to be realized in the LED 40.

The LED lighting circuit 10 is a DC/DC converter which generates a drive voltage Vd by stepping-up or stepping-down the input voltage Vin and applying the drive voltage to the LED 40. The LED lighting circuit 10 includes an input filter 192, an input protection unit 194, a voltage step-up and step-down converter 100 of a chopper type, an output filter 196, and a controller 124.

The input voltage Vin and the ground potential $V_{GND}$ are supplied to the voltage step-up and step-down converter 100 through the input filter 192 and the input protection unit 194. An output voltage of the voltage step-up and step-down converter 100 is output from the LED lighting circuit 10 through the output filter 196, and applied to the LED 40. The input filter 192 and the output filter 196 may be configured using a well-known filter technology. The input protection unit 194 may be configured using a well-known input protection technology.

The voltage step-up and step-down converter 100 includes a voltage step-down unit 102, a voltage step-up unit 104, an input capacitor 110, and a current detection resistor 116. An input voltage (more strictly, there is a case where the input voltage is different from the input voltage Vin applied to the LED lighting circuit 10, but the input voltage is described as the input voltage Vin to be more clear in the following description) passing through the input filter 192 and the input protection unit 194 is applied to one end of the input capacitor 110, and the other end thereof is grounded.

The current detection resistor 116 is disposed on a path of a drive current $I_{LED}$ flowing in the LED 40. In the embodiment, the current detection resistor 116 is provided between a ground terminal and the cathode of the LED 40. One end of the current detection resistor 116 is grounded. A voltage of the other end of the current detection resistor 116 is supplied to the controller 124 as a current detection voltage Vg. Since the drive current $I_{LED}$ flows in the current detection resistor 116, the current detection voltage Vg is a voltage corresponding to the magnitude of the drive current $I_{LED}$.

Topology of the voltage step-down unit 102 and the voltage step-up unit 104 will be briefly described since both are general.

The voltage step-down unit 102 generates the drive voltage Vd lower than the input voltage Vin by turning on or off a high-side n-type MOSFET 134 where the input voltage Vin is applied to a drain thereof in a voltage step-down mode. The voltage step-down unit 102 includes an output capacitor 108, an inductor 130, a second diode 132, and the high-side n-type MOSFET 134.

The drain of the high-side n-type MOSFET 134 is connected to one end of the input capacitor 110, and a source thereof is connected to a first connection node N1. The cathode of the second diode 132 is connected to the first connection node N1, and the anode thereof is grounded. One end of the inductor 130 is connected to the first connection node N1, and the other end thereof is connected to one end of the output capacitor 108 through the first diode 126. One end of the output capacitor 108 is also connected to the output filter 196. The other end of the output capacitor 108 is grounded. The first connection node N1 is connected to the controller 124.

In some cases, a voltage at one end of the output capacitor 108 and the drive voltage Vd are strictly different from each other due to the presence of the output filter 196. However, in order to clarify a description in the following, the voltage at one end of the output capacitor 108 is described as the drive voltage Vd.

In the voltage step-down mode, a high-side drive signal S1 output to a gate of the high-side n-type MOSFET 134 from the controller 124 is a signal of a rectangular waveform which is pulse-width modulated by a current feedback control based on the magnitude of the drive current $I_{LED}$ flowing in the LED 40. A drive frequency f2 which is a frequency of the high-side drive signal S1 ranges, for example, from hundreds of kHz to a few MHz. The high-side n-type MOSFET 134 is turned on or off in an on-duty cycle determined by the high-side drive signal S1, and voltages at both ends of the output capacitor 108 are drive voltages Vd which is lower than the input voltage Vin. The high-side drive signal S1 has an approximately constant voltage which is higher than the source voltage of the high-side n-type MOSFET 134 in the voltage step-up mode, and the high-side n-type MOSFET 134 is maintained in an ON state.

The voltage step-up unit 104 generates the drive voltage Vd higher than the input voltage Vin by turning on or off a low-side n-type MOSFET 128 where the ground potential $V_{GND}$ is applied to a source thereof in the voltage step-up mode. The voltage step-up unit 104 includes the output capacitor 108, the first diode 126, the low-side n-type MOSFET 128, and the inductor 130.

A drain of the low-side n-type MOSFET 128 is connected to a second connection node N2 between the other end of the inductor 130 and the anode of the first diode 126, and the source thereof is grounded.

In the voltage step-up mode, a low-side drive signal S2 output to a gate of the low-side n-type MOSFET 128 from the controller 124 is a signal of a rectangular waveform which is pulse-width modulated by a current feedback control based on the magnitude of the drive current $I_{LED}$, and a frequency thereof is the drive frequency f2. The low-side n-type MOSFET 128 is turned on or off in the on-duty cycle determined by the low-side drive signal S2, and voltages at both ends of the output capacitor 108 are drive voltages Vd higher than the input voltage Vin. A voltage of the low-side drive signal S2 is substantially fixed to the ground potential $V_{GND}$ in the voltage step-down mode, and the low-side n-type MOSFET 128 is maintained in an off state.

The controller 124 is an IC which controls the voltage step-up and step-down converter 100. The controller 124 controls ON and OFF of the high-side n-type MOSFET 134 and the low-side n-type MOSFET 128. The controller 124 includes a control voltage generation unit 136, a charge pump unit 138, a bootstrap unit 140, a clamping unit 142, an on and off controller 144, a dimming unit 146, and a voltage-current detection unit 148.

The control voltage generation unit 136 receives the input voltage Vin to generate a control voltage VCC. The control voltage VCC is supplied to each unit of the controller 124 from the control voltage generation unit 136. In general, the control voltage VCC is lower than any of the input voltage Vin and the drive voltage Vd, and is, for example, about 5 V. The control voltage VCC changes according to the input voltage Vin. In particular, when the input voltage Vin is equal to or less than a certain value, the control voltage VCC is lowered if the input voltage Vin is lowered.

The voltage-current detection unit 148 detects the drive voltage Vd and the drive current $I_{LED}$. The voltage-current detection unit 148 detects a voltage at one end of the output capacitor 108 as the drive voltage Vd. The voltage-current detection unit 148 detects the drive current $I_{LED}$ by obtaining a current detection voltage Vg.

The on and off controller 144 operates the voltage step-up and step-down converter 100 in the voltage step-up mode when the input voltage Vin is sufficiently lower than the drive voltage Vd, operates the voltage step-up and step-down converter 100 in the voltage step-down mode when the input voltage Vin is sufficiently higher than the drive voltage Vd, and operates the voltage step-up and step-down converter 100 in a hybrid mode when the input voltage Vin and the drive voltage Vd are approximately the same as each other or close to each other.

The on and off controller 144 compares the input voltage Vin with the drive voltage Vd detected by the voltage-current detection unit 148 to determine in which mode to operate the voltage step-up and step-down converter 100. In the hybrid mode, the on and off controller 144 turns on or off both the high-side n-type MOSFET 134 and the low-side n-type MOSFET 128. The on and off controller 144 generates the high-side drive signal S1 and the low-side drive signal S2 corresponding to the determined mode.

The on and off controller 144, in any of the modes, controls on or off of each n-type MOSFET so that the magnitude of the drive current $I_{LED}$ detected by the voltage-current detection unit 148 gets close to a target value. Particularly, the on and off controller 144 adjusts a duty ratio of the n-type MOSFET which is turned on or off.

The dimming unit 146 receives the dimming instruction signal Sa to generate a PWM dimming signal $S_{PWM}$ and inputs the PWM dimming signal into the on and off controller 144. The PWM dimming signal $S_{PWM}$ is a signal for blinking the LED 40 at a high speed, for example, a dimming frequency f1 from hundreds Hz to a few kHz. The dimming frequency f1 is lower than the drive frequency f2. More specifically, the PWM dimming signal $S_{PWM}$ is a signal whose voltage changes in a rectangular waveform at the dimming frequency f1. The dimming unit 146 sets the duty ratio of the PWM dimming signal $S_{PWM}$ based on the set value of a dimming rate indicated by the dimming instruction signal Sa. The duty ratio of the PWM dimming signal $S_{PWM}$ corresponds to the set value of the dimming rate. When the brightness of the LED 40 does not need to be adjusted, and the dimming instruction signal Sa does not indicate the set value, the PWM dimming signal $S_{PWM}$ is a signal whose voltage is substantially constant.

The on and off controller 144, in any of the modes, reflects the duty ratio of the PWM dimming signal $S_{PWM}$ in the high-side drive signal S1. The high-side n-type MOSFET 134 includes both a function of a switching element of the voltage step-down unit 102 and a function of an on and off switch of the entire voltage step-up and step-down converter 100. Accordingly, by reflecting the duty ratio of the PWM dimming signal $S_{PWM}$ in the high-side drive signal S1, it is possible to blink the LED 40.

Figure 2A:
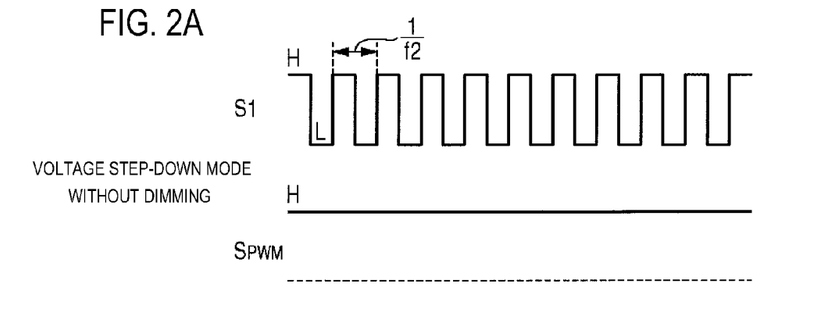
FIGS. 2A to 2D are waveform diagrams showing the relationship between a PWM dimming signal and a high-side drive signal in a voltage step-up mode and a voltage step-down mode.

FIGS. 2A to 2D are waveform diagrams showing the relationship between the PWM dimming signal $S_{PWM}$ and the high-side drive signal S1 in the voltage step-up mode and the voltage step-down mode. FIG. 2A corresponds to a case where there is no dimming in the voltage step-down mode. The high-side drive signal S1 is a rectangular wave signal of the drive frequency f2, and the duty ratio thereof is determined by the difference between the drive current $I_{LED}$ and the target value. Since there is no dimming, the PWM dimming signal $S_{PWM}$ is substantially constant at a high level.

Figure 2B:
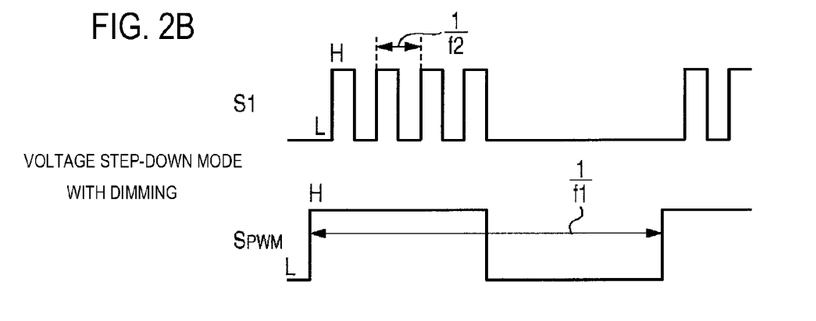

FIG. 2B corresponds to a case where there is dimming in the voltage step-down mode. The PWM dimming signal $S_{PWM}$ corresponds to a rectangular wave signal of the dimming frequency f1, and the duty ratio thereof corresponds to the set value of the dimming rate. The PWM dimming signal $S_{PWM}$ is superimposed on the high-side drive signal S1, and in a section where the PWM dimming signal $S_{PWM}$ becomes a low level, the high-side drive signal S1 is also maintained at a low level. In a section where the PWM dimming signal $S_{PWM}$ becomes a high level, the high-side drive signal S1 is a rectangular wave signal of the drive frequency f2. The duty ratio of the high-side drive signal S1 at this time is determined by the difference between the drive current $I_{LED}$ and the target value.

Figure 2C:
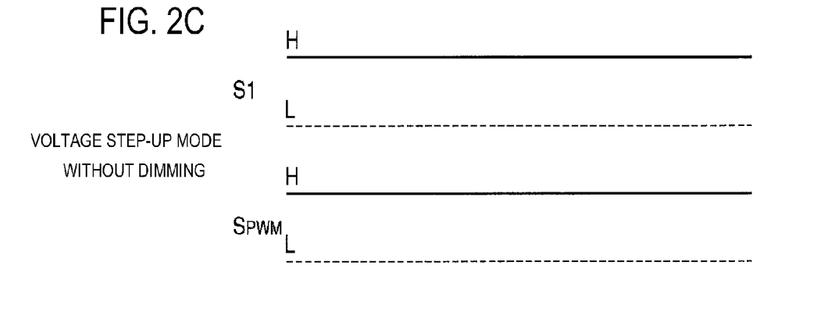

FIG. 2C corresponds to a case where there is no dimming in the voltage step-up mode. The high-side drive signal S1 is substantially constant at a high level, and the high-side n-type MOSFET 134 is maintained in an on state.

Figure 2D:
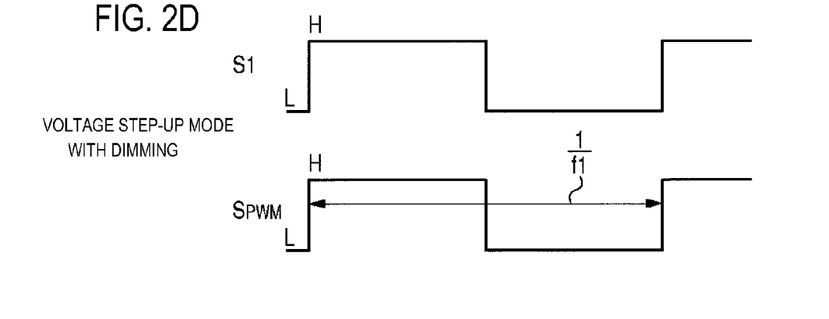

FIG. 2D corresponds to a case where there is dimming in the voltage step-up mode. The PWM dimming signal $S_{PWM}$ is a rectangular wave signal of the dimming frequency f1, and the duty ratio thereof corresponds to the set value of the dimming rate. The PWM dimming signal $S_{PWM}$ is superimposed on the high-side drive signal S1, and the frequency and the duty ratio of the high-side drive signal S1 are substantially the same as the frequency and the duty ratio of the PWM dimming signal $S_{PWM}$. That is, the high-side drive signal S1 is a rectangular wave signal of the dimming frequency f1. Therefore, the high-side n-type MOSFET 134 repeats ON and OFF at the dimming frequency f1.

As a method of adjusting the brightness of the LED 40, it is considered to change a target value of the current feedback control in the on and off controller 144. However, this method is not preferable since, in this case, a color shift in which a color tone or a color temperature of the LED 40 is changed by a change in the drive current $I_{LED}$ can occur. When adopting a PWM dimming as in the embodiment, the drive current $I_{LED}$ flowing in the LED 40 is basically a value near the target value, such that the color shift is unlikely to occur.

Returning back to FIG. 1, the bootstrap unit 140 drives the high-side n-type MOSFET 134. That is, a voltage necessary to turn on the high-side n-type MOSFET 134 is supplied to the on and off controller 144. The bootstrap unit 140 includes a bootstrap capacitor. One end of the bootstrap capacitor is connected to the source of the high-side n-type MOSFET 134, and the source voltage of the high-side n-type MOSFET 134 is applied to one end of the bootstrap capacitor. The bootstrap unit 140 charges the bootstrap capacitor based on a change in the source voltage of the high-side n-type MOSFET 134 which repeats ON and OFF in the voltage step-down mode. The voltage of the charged bootstrap capacitor is supplied to the on and off controller 144, and is used to generate a high level of the high-side drive signal S1.

In the voltage step-up mode in which the PWM dimming is not performed, a change in the source voltage of the high-side n-type MOSFET 134 is basically suppressed or is not present. Therefore, in the voltage step-up mode, a charging operation of the bootstrap unit 140 is suppressed or stops. The charge pump unit 138, in the voltage step-up mode, charges the bootstrap capacitor instead of the charging operation of the bootstrap unit 140. The charge pump unit 138 repeats charging from one end of the output capacitor 108 to the pump capacitor and discharging from the charged pump capacitor to the bootstrap capacitor in the voltage step-up mode.

The clamping unit 142 is provided between one end of the output capacitor 108 and the charge pump unit 138. The clamping unit 142 converts the drive voltage Vd which is a voltage at one end of the output capacitor 108 to a clamp voltage which is lower than the drive voltage, and applies the clamp voltage to the pump capacitor of the charge pump unit 138.

Figure 3:
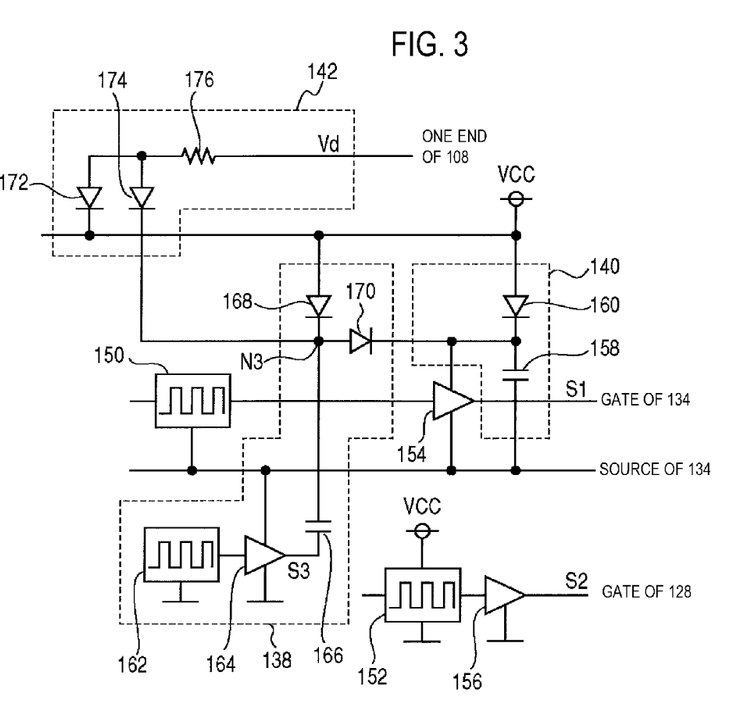
FIG. 3 is a circuit diagram which shows the configuration of a charge pump unit, a bootstrap unit, and a clamping unit.

FIG. 3 is a circuit diagram which shows the configuration of the charge pump unit 138, the bootstrap unit 140, and the clamping unit 142. A portion of the on and off controller 144 is also shown in FIG. 3. The on and off controller 144 includes a first oscillator 150, a second oscillator 152, a first driver 154, and a second driver 156.

The first oscillator 150 generates a signal of a rectangular waveform of the drive frequency f2, and outputs the signal to the first driver 154 in the voltage step-down mode. The duty ratio of the signal is determined by the current feedback control of the on and off controller 144. The first oscillator 150 is connected to the source of the high-side n-type MOSFET 134. The first oscillator 150 generates a signal which is substantially constant at a high level, and outputs the signal to the first driver 154 in the voltage step-up mode.

The first driver 154 is connected to the source of the high-side n-type MOSFET 134 and the bootstrap unit 140. The first driver 154 generates the high-side drive signal S1 based on a signal output by the first oscillator 150, and supplies the high-side drive signal to the gate of the high-side n-type MOSFET 134. A phase of the high-side drive signal S1 is substantially the same as a phase of the signal output by the first oscillator 150. The low level of the high-side drive signal S1 is a source voltage of the high-side n-type MOSFET 134, and the high level thereof is a bootstrap voltage supplied by the bootstrap unit 140.

The second oscillator 152 generates a signal of a rectangular waveform of the drive frequency f2, and outputs the signal to the second driver 156 in the voltage step-up mode. The duty ratio of the signal is determined by the current feedback control of the on and off controller 144. The second oscillator 152 generates a signal which is substantially constant at a low level, and outputs the signal to the second driver 156 in the voltage step-down mode.

The second driver 156 generates the low-side drive signal S2 based on a signal which is output by the second oscillator 152 and supplies the signal to the gate of the low-side n-type MOSFET 128. A phase of the low-side drive signal S2 is substantially the same as a phase of the signal which is output by the second oscillator 152. The low level of the low-side drive signal S2 is a ground potential $V_{GND}$, and the high level thereof is a control voltage VCC.

The bootstrap unit 140 includes a bootstrap capacitor 158 and a third diode 160. One end of the bootstrap capacitor 158 is connected to the source of the high-side n-type MOSFET 134. A voltage at the other end of the bootstrap capacitor 158 is supplied to the first driver 154 as a bootstrap voltage. The control voltage VCC is applied to the anode of the third diode 160, and the cathode thereof is connected to the other end of the bootstrap capacitor 158.

In the voltage step-down mode, when the high-side n-type MOSFET 134 is turned off, the second diode 132 conducts electricity, and the source voltage of the high-side n-type MOSFET 134 is lowered to near the ground potential $V_{GND}$. Then, the bootstrap capacitor 158 is charged from the control voltage VCC through the third diode 160. A voltage of the charged bootstrap capacitor 158 is VCC−Vf when a forward dropping voltage of the third diode 160 is set to Vf. Next, at a time when the high-side n-type MOSFET 134 is turned on, the voltage of the charged bootstrap capacitor 158 is supplied to the first driver 154. By shortening the ON and OFF period of the high-side n-type MOSFET 134 to an extent that leakage of the bootstrap capacitor 158 can be neglected, a bootstrap voltage which is higher than the source voltage of the high-side n-type MOSFET 134 by VCC−Vf is supplied to the first driver 154.

The clamping unit 142 includes a sixth diode 172, a seventh diode 174, and a clamp resistor 176. One end of the clamp resistor 176 is connected to one end of the output capacitor 108, and the drive voltage Vd is applied to one end of the clamp resistor 176. The other end of the clamp resistor 176 is connected to the anode of the sixth diode 172 and the anode of the seventh diode 174. The control voltage VCC is applied to the cathode of the sixth diode 172. The cathode of the seventh diode 174 is connected to the charge pump unit 138.

When forward dropping voltages of the sixth diode 172 and the seventh diode 174 are all set to Vf which is the same as the forward dropping voltage of the third diode 160, a voltage of the anode of the seventh diode 174 is clamped to VCC+Vf by the operations of the clamp resistor 176 and the sixth diode 172. Therefore, an output voltage of the clamping unit 142, that is, a voltage of the cathode of the seventh diode 174, is clamped to the control voltage VCC.

The charge pump unit 138 includes a third oscillator 162, a third driver 164, a pump capacitor 166, a fourth diode 168, and a fifth diode 170. The third oscillator 162 generates a signal of a rectangular waveform of a predetermined frequency, and outputs the signal to the third driver 164. The third driver 164 is connected to the source of the high-side n-type MOSFET 134. The third driver 164 generates a pump drive signal S3 based on a signal output by the third oscillator 162, and supplies the signal to one end of the pump capacitor 166. A phase of the pump drive signal S3 is substantially the same as a phase of the signal output by the third oscillator 162. The low level of the pump drive signal S3 is the ground potential $V_{GND}$, and the high level thereof is the source voltage of the high-side n-type MOSFET 134.

The other end of the pump capacitor 166 is connected to the cathode of the fourth diode 168 at a third connection node N3. The third connection node N3 is connected to the anode of the fifth diode 170 and the cathode of the seventh diode 174 of the clamping unit 142. Therefore, the control voltage VCC is applied to the third connection node N3 from the clamping unit 142. The control voltage VCC is applied to the anode of the fourth diode 168. The cathode of the fifth diode 170 is connected to the other end of the bootstrap capacitor 158.

In the voltage step-up mode, when the pump drive signal S3 becomes a low level, the pump capacitor 166 is charged from the clamping unit 142. A voltage of the charged pump capacitor 166 is the control voltage VCC. Next, at a timing when the pump drive signal S3 becomes a high level (that is, the source voltage of the high-side n-type MOSFET 134), the charged pump capacitor 166 discharges a charge to the bootstrap capacitor 158 through the fifth diode 170. The voltage of the bootstrap capacitor 158 which is charged by the discharge of the pump capacitor 166 is VCC−Vf when the forward dropping voltage of the fifth diode 170 is set to Vf which is the same as the forward dropping voltage of the third diode 160. Therefore, a bootstrap voltage which is higher than the source voltage of the high-side n-type MOSFET 134 by VCC−Vf is supplied to the first driver 154 in the voltage step-up mode.

In order to describe benefits of the LED lighting circuit 10 according to the embodiment, a comparative example is considered in which a path from one end of the output capacitor 108 to the third connection node N3 is removed from the configuration shown in FIG. 3. In the comparative example, in the voltage step-up mode, when the pump drive signal S3 becomes a low level, the pump capacitor 166 is charged from the control voltage VCC through the fourth diode 168. When the forward dropping voltage of the fourth diode 168 is set to Vf the same as the forward dropping voltage of the third diode 160, a voltage of the charged pump capacitor 166 is VCC−Vf. Next, at a time when the pump drive signal S3 becomes a high level, the charged pump capacitor 166 discharges a charge to the bootstrap capacitor 158 through the fifth diode 170. A voltage of the bootstrap capacitor 158 charged by the discharge of the pump capacitor 166 is VCC-2XVf.

When a battery voltage Vbat is lowered by the consumption of the vehicle battery 30 and the start-up of other electrical equipment in which the vehicle battery 30 is used, the input voltage Vin is also lowered. When the input voltage Vin is lowered, a mode of the LED lighting circuit is changed from the voltage step-down mode to the hybrid mode, and when the input voltage Vin is further lowered, the mode of the LED lighting circuit is changed from the hybrid mode to the voltage step-up mode. In the voltage step-up mode, it is necessary to maintain the ON state of the high-side n-type MOSFET 134.

Here, since the control voltage VCC is generated from the input voltage Vin, the control voltage VCC is also lowered when the input voltage Vin is lowered. Therefore, the ON state of the high-side n-type MOSFET 134 is unlikely to be maintained. In particular, when VCC-2XVf falls below a gate threshold voltage of the high-side n-type MOSFET 134 as a result of the lowering of the control voltage VCC, the ON state of the high-side n-type MOSFET 134 cannot be maintained, thereby lowering the drive voltage Vd. The lowering of the drive voltage Vd adversely affects the emission characteristics of the LED 40.

For example, when it is assumed that a gate threshold voltage is 3.0 V, 2XVf is 2.0 V, and a voltage drop of the control voltage generation unit 136 is 0.5 V, the ON state of the high-side n-type MOSFET 134 cannot be maintained if the input voltage Vin is equal to or less than 5.5 V.

Therefore, in the LED lighting circuit 10 according to the embodiment, the pump capacitor 166 of the charge pump unit 138 is charged, in the voltage step-up mode, by the charging current from a terminal to which the drive voltage Vd higher than the control voltage VCC and the input voltage Vin is applied. Therefore, as described above, the voltage of the bootstrap capacitor 158 which is charged by the discharge of the pump capacitor 166 is VCC−Vf That is, the voltage of the charged bootstrap capacitor 158 is higher than that in the comparative example by Vf. As a result, it is possible to maintain a sufficient drive voltage Vd even for a lower input voltage Vin, capability of maintaining the emission characteristics with respect to changes in the input voltage Vin is improved.

In addition, the clamping unit 142 is provided in the LED lighting circuit 10 according to the embodiment to clamp a voltage applied from one end of the output capacitor 108 to the charge pump unit 138. The drive voltage Vd is increased or decreased depending on an application and an environment. By providing the clamping unit 142, the drive voltage Vd becomes relatively high and it is possible to suppress or prevent the withstand voltage failure of elements of the charge pump unit 138 and the bootstrap unit 140.

Figure 4:
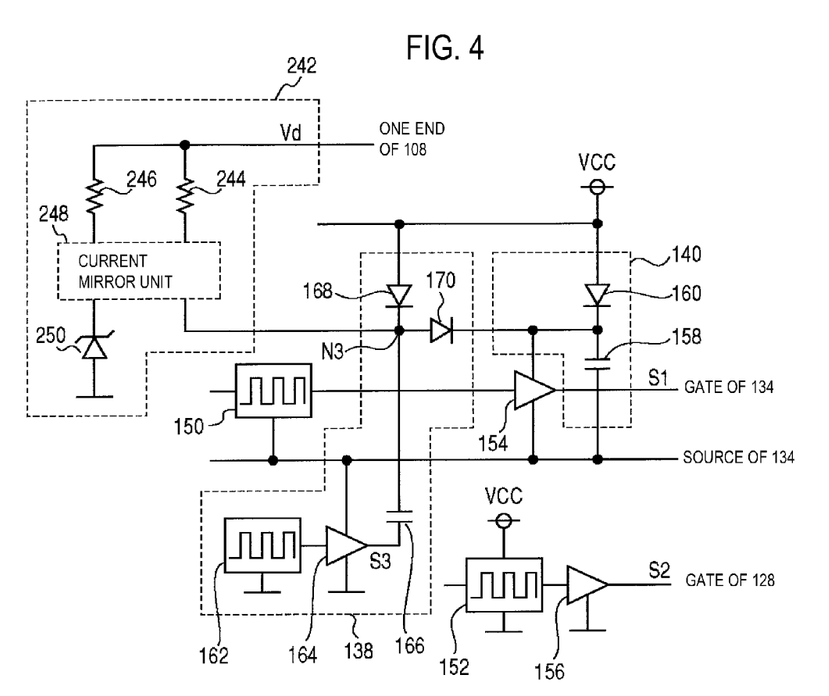
FIG. 4 is a circuit diagram which shows the configuration of the charge pump unit, the bootstrap unit, and a clamping unit which is according to a first modification example.

FIG. 4 is a circuit diagram which shows the configuration of the charge pump unit 138, the bootstrap unit 140, and a clamping unit 242 which is according to a first modification example. The clamping unit 242 is provided between one end of the output capacitor 108 and the third connection node N3 of the charge pump unit 138. The clamping unit 242 includes a first resistor 244, a second resistor 246, a current mirror unit 248, and a zener diode 250.

One end of the first resistor 244 and one end of the second resistor 246 are connected to one end of the output capacitor 108, respectively. The other end of the first resistor 244 and the other end of the second resistor 246 are connected to the current mirror unit 248, respectively. The cathode of the zener diode 250 is connected to the current mirror unit 248, and the anode thereof is grounded. The input current of the current mirror unit 248 flows in the second resistor 246 and the zener diode 250, and the output current thereof flows in the first resistor 244 to be supplied to the third connection node N3.

When the resistance value of the first resistor 244 is substantially the same as the resistance value of the second resistor 246, a voltage applied from the clamping unit 242 to the third connection node N3 is clamped to the zener voltage of the zener diode 250. In the voltage step-up mode, when the pump drive signal S3 becomes a low level, the pump capacitor 166 is charged from the clamping unit 242. The voltage of the charged pump capacitor 166 is the zener voltage of the zener diode 250. Therefore, it is possible to reduce adverse effects on the charging voltage of the bootstrap capacitor 158 due to the lowering of the input voltage yin and the control voltage VCC.

Figure 5:
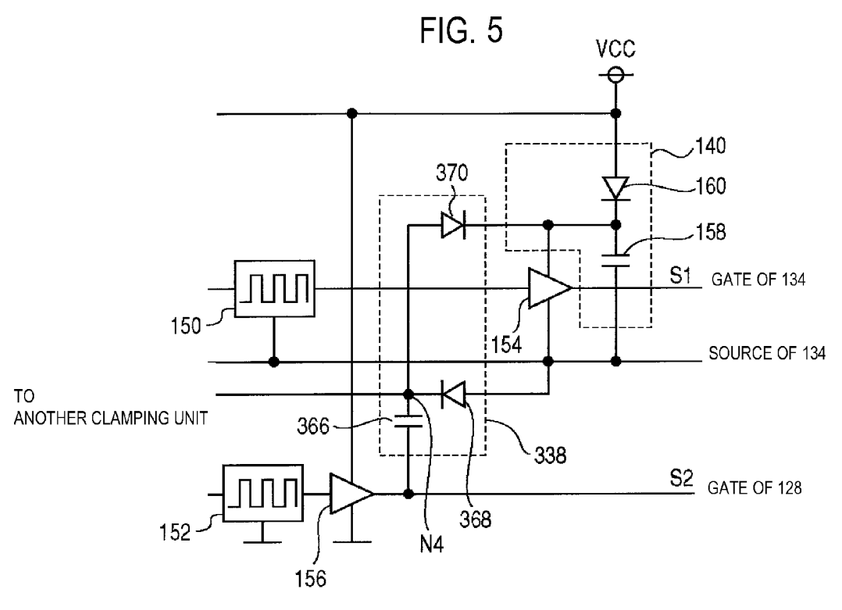
FIG. 5 is a circuit diagram which shows the configuration of a charge pump unit according to a second modification example and the bootstrap unit.

FIG. 5 is a circuit diagram which shows the configuration of a charge pump unit 338 according to a second modification example and the bootstrap unit 140. The charge pump unit 338 charges the bootstrap capacitor 158 by using a change in the voltage of the low-side drive signal S2 in the voltage step-up mode. The charge pump unit 338 includes a pump capacitor 366, an eighth diode 368, and a ninth diode 370.

The low-side drive signal S2 is input to one end of the pump capacitor 366. The other end of the pump capacitor 366 is connected to the cathode of the eighth diode 368 at the fourth connection node N4. The anode of the ninth diode 370 is also connected to the fourth connection node N4. The anode of the eighth diode 368 is connected to the source of the high-side n-type MOSFET 134. The cathode of the ninth diode 370 is connected to the other end of the bootstrap capacitor 158. The fourth connection node N4 has a similar configuration to the clamping unit 142, and is connected to another clamping unit (not illustrated) which converts the drive voltage Vd to the source voltage of the high-side n-type MOSFET 134. The pump capacitor 366 is charged by the charging current flowing in a charging path which leads from one end of the output capacitor 108 to the fourth connection node N4 through another clamping unit.

In the voltage step-up mode, when the low-side drive signal S2 becomes a low level, the pump capacitor 366 is charged through the charging path from one end of the output capacitor 108. A voltage of the charged pump capacitor 366 is the source voltage (≅the input voltage Vin) of the high-side n-type MOSFET 134. Next, at a time when the low-side drive signal S2 becomes a high level (that is, the control voltage VCC), the charged pump capacitor 366 discharges a charge to the bootstrap capacitor 158 through the ninth diode 370. The voltage of the bootstrap capacitor 158 which is charged by the discharge of the pump capacitor 366 is VCC−Vf when the forward dropping voltage of the ninth diode 370 is set to Vf the same as the forward dropping voltage of the third diode 160. Therefore, in the voltage step-up mode, a bootstrap voltage which is higher than the source voltage of the high-side n-type MOSFET 134 by VCC−Vf is supplied to the first driver 154.

According to the modification example, an operation effect similar to the operation effect exerted by the LED lighting circuit 10 according to the embodiment is exerted. In addition, a main difference between the charge pump unit 338 according to the modification example and the charge pump unit 138 according to the embodiment is as follows.

In the charge pump unit 138 according to the embodiment, an oscillator for a charge pump is additionally provided. In this case, the withstand voltage of the pump capacitor 166 is about the control voltage VCC, so that it is easy to incorporate the pump capacitor 166 into an IC. In contrast, the charge pump unit 338 according to the embodiment commonizes an oscillator for generating the low-side drive signal S2 and an oscillator for driving the charge pump unit 338. The second oscillator 152 is shared by the driving of the low-side n-type MOSFET 128 and the driving of the charge pump unit 338. In this case, the withstand voltage of the pump capacitor 366 needs to be set to the input voltage Vin or higher, but only the oscillator for the charge pump unit 338 does not need to be provided. Therefore, it is possible to suppress an increase in a circuit scale.

Second Embodiment

In the first embodiment, the charging voltage of the bootstrap capacitor is increased using the drive voltage Vd in the voltage step-up mode. Accordingly, an adverse effect due to the lowering of the control voltage VCC is reduced. In the second embodiment, when the control voltage VCC is lowered in the voltage step-up mode, the PWM dimming function is forcedly started. Accordingly, the bootstrap unit 140 functions to suppress the lowering of the charging voltage of the bootstrap capacitor.

Figure 6:
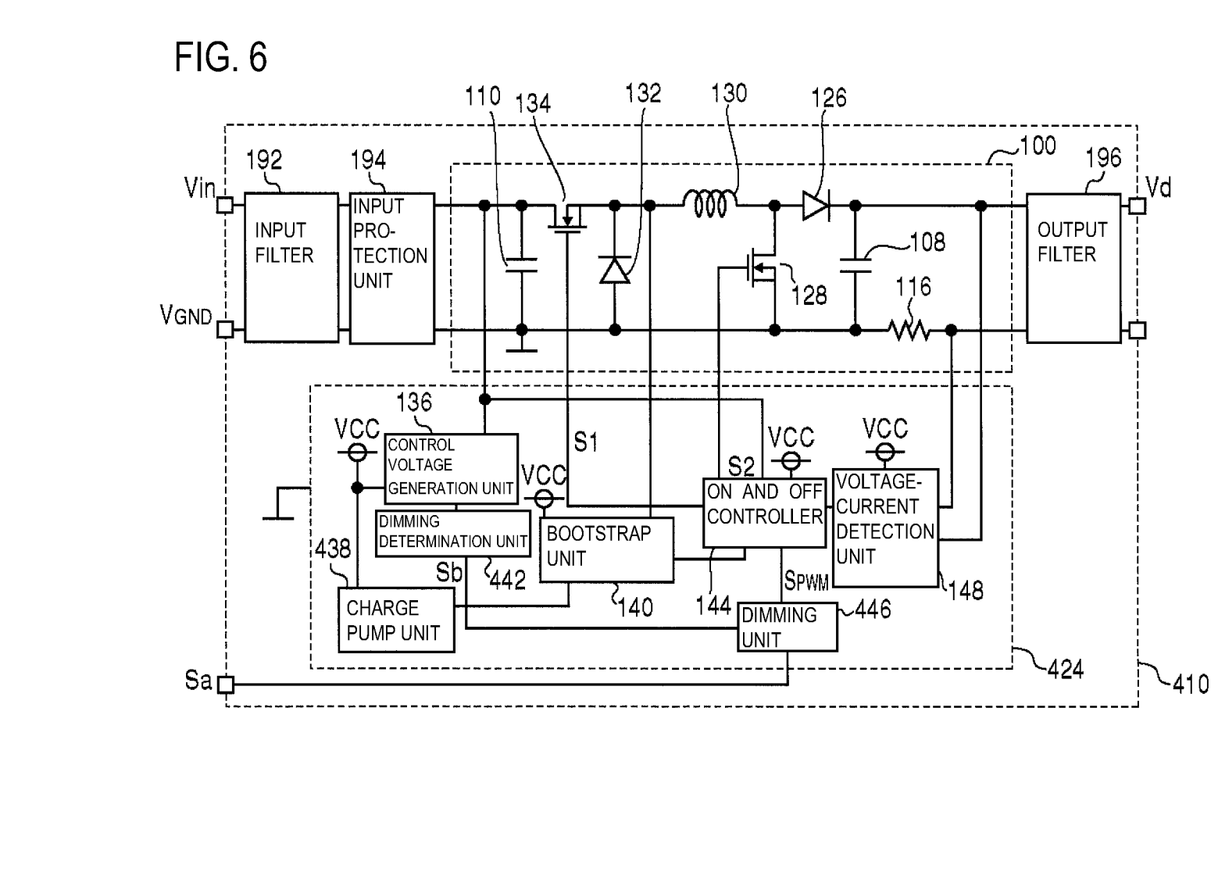
FIG. 6 is a circuit diagram which shows the configuration of an LED lighting circuit according to a second embodiment.

FIG. 6 is a circuit diagram which shows the configuration of an LED lighting circuit 410 according to the second embodiment. The LED lighting circuit 410 includes the input filter 192, the input protection unit 194, the voltage step-up and step-down converter 100, the output filter 196, and a controller 424.

The controller 424 includes the control voltage generation unit 136, a dimming determination unit 442, a charge pump unit 438, the bootstrap unit 140, the on and off controller 144, a dimming unit 446, and the voltage-current detection unit 148. The charge pump unit 438 has a configuration obtained by removing a path which leads from one end of the output capacitor 108 to the third connection node N3 from the configuration of the charge pump unit 138 shown in FIG. 3.

The dimming determination unit 442, in the voltage step-up mode, starts a PWM dimming control for the dimming unit 446 when the control voltage VCC generated by the control voltage generation unit 136 is lower than a predetermined threshold control voltage. The dimming determination unit 442 generates a compulsory dimming instruction signal Sb to output the signal to the dimming unit 446. The dimming determination unit 442, in the voltage step-up mode, allows the compulsory dimming instruction signal Sb to transit from a low level to a high level when the control voltage VCC is lower than the threshold control voltage. The dimming determination unit 442 maintains the compulsory dimming instruction signal Sb at a low level in the voltage step-down mode. Comparison between the control voltage VCC with the threshold control voltage and generation of the compulsory instruction signal Sb by the dimming determination unit 442 may be realized in a general circuit using a comparator and the like.

The relationship between the dimming unit 446 and the dimming instruction signal Sa is similar to one between the dimming unit 146 and the dimming instruction signal Sa in the first embodiment. The dimming unit 446, when the compulsory dimming instruction signal Sb becomes a high level, generates the PWM dimming signal $S_{PWM}$, and inputs the signal to the on and off controller 144. When performing the PWM dimming in the voltage step-up mode, as shown in FIG. 2D, the high-side n-type MOSFET 134 repeats ON and OFF at the dimming frequency f1. Therefore, the source voltage of the high-side n-type MOSFET 134 changes at the dimming frequency f1. The bootstrap unit 140 is driven by the change in the source voltage, and the bootstrap capacitor 158 is charged.

According to the LED lighting circuit 410 in the embodiment, the voltage of the bootstrap capacitor 158 which is charged by the compulsory PWM dimming control is VCC−Vf. In contrast, the voltage of the bootstrap capacitor 158 which is charged by the discharge of the pump capacitor of the charge pump unit 438 is VCC−2XVf. Therefore, by compulsorily starting the PWM dimming control in the voltage step-up mode, it is possible to increase the voltage of the charged bootstrap capacitor 158 by Vf without providing the clamping unit 142 as in the first embodiment. As a result, it is possible to maintain a sufficient drive voltage Vd for a lower input voltage Vin, so that the capability of maintaining the emission characteristics with respect to changes in the input voltage Vin is improved In addition, since the LED lighting circuit 410 according to the embodiment starts the PWM dimming control according to the lowering of the input voltage Vin, it is possible to lower the brightness of the LED 40 according to the lowering of the input voltage Vin. In this manner, by adopting the PWM dimming using the high-side n-type MOSFET 134 in the voltage step-up mode, it is possible to realize both suppression of the lowering of the charging voltage of the bootstrap capacitor 158 and brightness adjustment according to the input voltage Vin.

The configuration and the operation of the LED lighting circuit according to the embodiment are described above. These embodiments are exemplifications, and it will be understood by those skilled in the art that various modification examples can be made for the combination of each component and each processing in these embodiments and the modification examples are within the scope of the invention. In addition, the embodiments can be combined with each other. For example, in the LED lighting circuit 10 according to the first embodiment, the compulsory PWM dimming control according to the second embodiment may be incorporated.

In the first embodiment, a case in which the charge pump unit 138 includes the fourth diode 168 is described, but the embodiment is not limited thereto. The charge pump unit may not include the fourth diode 168. In addition, in the second embodiment, a case in which the charge pump unit 338 includes the eighth diode 368 is described, but the embodiment is not limited thereto. The charge pump unit may not include the eighth diode 368.

What is claimed is:
1. A semiconductor light source lighting circuit which receives an input voltage and applies a drive voltage to a semiconductor light source, comprising:
a voltage step-down unit configured to generate the drive voltage lower than the input voltage by turning on or off a first switching element in a voltage step-down mode, the first switching element having one end to which the input voltage is applied;
a voltage step-up unit configured to generate the drive voltage higher than the input voltage by turning on or off a second switching element in a voltage step-up mode, the second switching element having one end to which a fixed voltage lower than the input voltage is applied; and a controller configured to control on or off of the first switching element and the second switching element, wherein the first switching element is turned on when a voltage applied to a control terminal of the first switching element is higher than a voltage at the other end of the first switching element, and wherein the controller includes:

a bootstrap unit configured to charge a first capacitor based on a change in voltage at the other end of the first switching element in the voltage step-down mode;

a charge pump unit configured to repeat charging from a terminal to which the drive voltage is applied to a second capacitor and discharging from the second capacitor which is charged to the first capacitor in the voltage step-up mode; and a switch drive unit configured to apply a voltage higher than the voltage at the other end of the first switching element to the control terminal of the first switching element by using a voltage of the first capacitor which is charged when the first switching element is turned on.

2. The semiconductor light source lighting circuit according to claim 1, wherein the controller further includes a clamping unit configured to convert the drive voltage into a voltage lower than the drive voltage, and to apply the converted voltage to the second capacitor.

3. The semiconductor light source lighting circuit according to claim 1, wherein the controller further includes a control voltage generation unit configured to generate a control voltage for operating the controller from the input voltage.

4. A vehicular lamp comprising:

the semiconductor light source lighting circuit according to claim 1; and a semiconductor light source to which the drive voltage is applied by the semiconductor light source lighting circuit.

5. A semiconductor light source lighting circuit which receives an input voltage and applies a drive voltage to a semiconductor light source, comprising:

a voltage step-down unit configured to generate the drive voltage lower than the input voltage by turning on or off a first switching element in a voltage step-down mode, the first switching element having one end to which the input voltage is applied;

a voltage step-up unit configured to generate the drive voltage higher than the input voltage by turning on or off a second switching element in a voltage step-up mode, the second switching element having one end to which a fixed voltage lower than the input voltage is applied; and a controller configured to control on or off of the first switching element and the second switching element, wherein the first switching element is turned on when a voltage applied to a control terminal of the first switching element is higher than the voltage at the other end of the first switching element, wherein the controller includes:

a control voltage generation unit configured to generate a control voltage for operating the controller from the input voltage;

a bootstrap unit configured to charge a first capacitor based on a change in voltage at the other end of the first switching element in the voltage step-down mode;

a charge pump unit configured to repeat charging to a second capacitor and discharging from the second capacitor which is charged to the first capacitor in the voltage step-up mode;

a switch drive unit configured to apply a voltage higher than the voltage at the other end of the first switching element to the control terminal of the first switching element by using a voltage of the first capacitor which is charged when the first switching element is turned on; and a compensation unit configured to start a control to turn on or off the first switching element at a first frequency when the control voltage is lower than a threshold voltage in the voltage step-up mode, and wherein a second frequency at which the second switching element is turned on or off is higher than the first frequency in the voltage step-up mode.

6. The semiconductor light source lighting circuit according to claim 1, wherein the first switching element is an n-type metal oxide semiconductor field effect transistor.

7. The semiconductor light source lighting circuit according to claim 5, wherein the first switching element is an n-type metal oxide semiconductor field effect transistor.

8. A vehicular lamp comprising:

the semiconductor light source lighting circuit according to claim 5; and a semiconductor light source to which the drive voltage is applied by the semiconductor light source lighting circuit.

* * * * *

UNITED STATES PATENT AND TRADEMARK OFFICE
CERTIFICATE OF CORRECTION

PATENT NO. : 8,970,136 B2
APPLICATION NO. : 14/197571
DATED : March 3, 2015
INVENTOR(S) : Satoshi Kikuchi et al.

It is certified that error appears in the above-identified patent and that said Letters Patent is hereby corrected as shown below:

Title page, item (73) Assignee:

delete "Panasonic Corporation, Tokyo (JP)"

insert --Koito Manufacturing Co., Ltd., Tokyo (JP) and Panasonic Corporation, Osaka (JP)--

Signed and Sealed this
Sixth Day of October, 2015

Michelle K. Lee
*Director of the United States Patent and Trademark Office*